July 20, 1926.

R. M. RANYARD

GAS FILTER

Filed Sept. 4, 1924

1,593,221

Inventor
R. M. Ranyard
by Hazard and Miller
Attys

Patented July 20, 1926.

1,593,221

UNITED STATES PATENT OFFICE.

REGINALD M. RANYARD, OF PALMS, CALIFORNIA, ASSIGNOR TO R. G. T. MFG. CO., OF LOS ANGELES, CALIFORNIA, A CORPORATION OF CALIFORNIA.

GAS FILTER.

Application filed September 4, 1924. Serial No. 735,388.

This invention relates to improvements in gas filters.

It is an object of the invention to provide a gas filter adapted to be readily inserted in a pipe line, wherein gas discharged into the filter will strike an inclined baffle plate before passing through an aperture in the baffle plate and being filtered through fibrous material.

A further object of the invention is to provide a filter adapted to be readily inserted in a pipe line, which may be easily and quickly cleaned and which has means provided thereon for easily and quickly removing and replacing the fibrous filtering material.

With the foregoing and other objects in view which will be made manifest in the following detailed description, reference is had to the accompanying drawings for an illustrative embodiment of the invention wherein.

Figure 1:
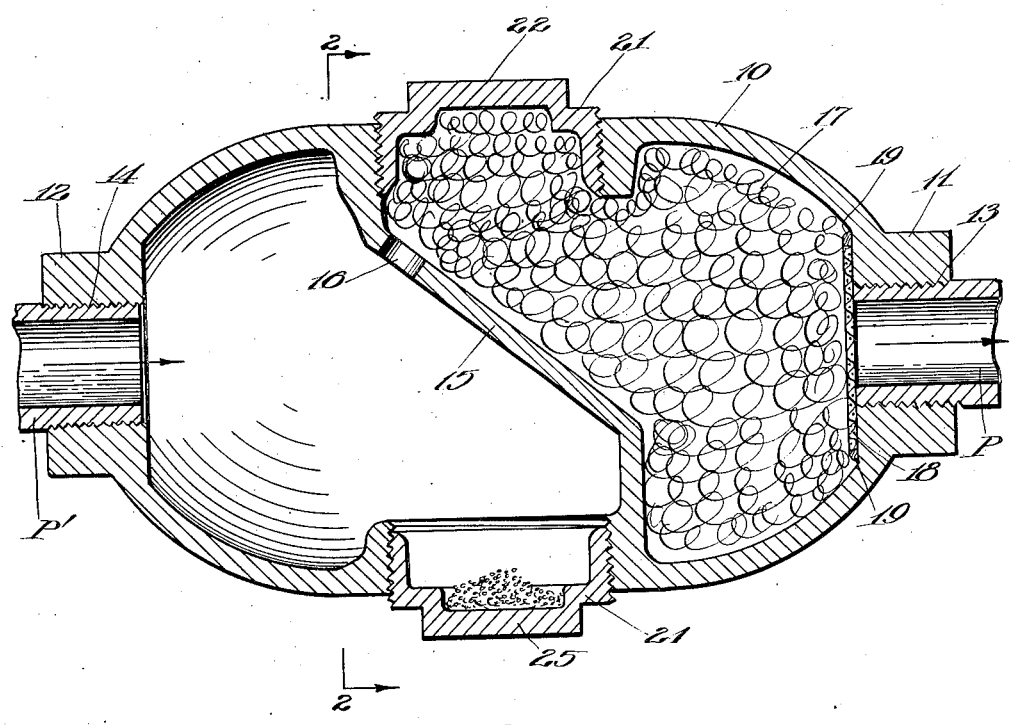
Figure 1 is a vertical section through the improved gas filter.
Figure 2:
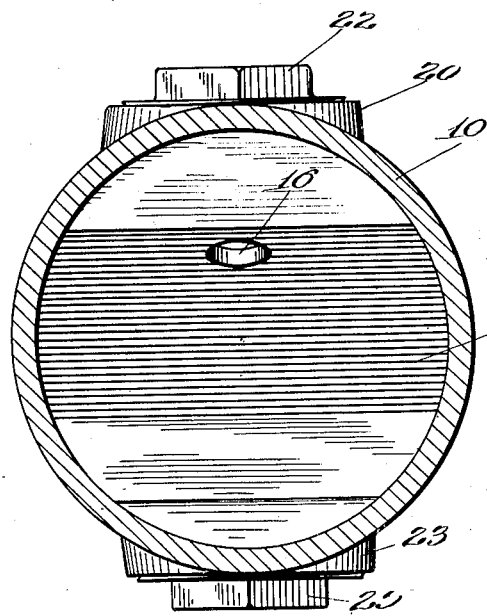
Fig. 2 is a vertical section taken substantially on the line 2—2 of Fig. 1.

Referring to the accompanying drawings wherein similar reference characters designate similar parts throughout, the filter comprises a hollow cylindrical shell 10 having its ends rounded and provided with bosses 11 and 12 which are interiorly threaded as at 13 and 14 respectively to receive the ends of the respective pipes P and P'. The shell 10, in the preferred form of construction, has an inclined baffle plate 15 formed integral therewith forming a partition extending completely across the shell 10.

This baffle plate 15 is provided near its upper edge with an aperture 16 through which gas discharged into the filter from the pipe P' may pass after striking the inclined baffle plate 15 and become filtered by passing through the fibrous filtering material 17. A wire screen 18 or its equivalent is secured in any suitable manner as by solder 19 upon the inner face of the boss 11 and serves to retain the fibrous filtering material within the shell 10. Upon the top of the shell 10 is formed a boss 20 which has an opening therein communicating with the chamber within the shell 10 containing the filtering material 17. The opening in the boss 20 is interiorly threaded to receive a suitable plug 21 which is preferably provided with a square top 22 to facilitate the application of a wrench upon removing the plug. A second boss 23 is disposed substantially directly beneath the boss 20 and is provided with an opening communicating with the chamber within the shell 10 in front of the inclined baffle plate 15. This opening in the boss 23 is interiorly threaded to receive a plug 24, also provided with a square extension 25.

The operation of the filter is as follows: Gas enters the filter through the pipe P' and strikes against the inclined baffle plate 15. Any liquid or solid particles upon striking the inclined baffle plate 15 will be deflected downwardly so that the majority of the solid particles and liquid will collect in the hollow interior of the plug 24. After the entering gas strikes the baffle plate 15, it is allowed to pass through the aperture 16 and to filter through the fibrous material 17, passing through the screen 18 and to exit through the pipe P.

When it is desired to clean the filter, the removal of the plug 24 will permit the solid particles deflected by the baffle plate 15 to be removed from the shell 10. The fibrous material 17 may be withdrawn from the shell 10 and to be replaced upon the removal of the plug 21.

It is to be understood that various changes in the detail of construction may be made without departing from the spirit or scope of the invention as defined by the appended claims.

I claim:

1. A gas filter comprising a shell, an inclined baffle plate disposed within the shell, there being an outlet and an inlet formed in the opposite ends of the shell which are substantially opposite the center of the baffle plate, there being an aperture in the baffle plate in that end which is most adjacent the inlet, and a fibrous filtering material filling the space between the baffle plate and the outlet.

2. A gas filter comprising a shell, an inclined baffle plate disposed within the shell, there being an outlet and an inlet formed in the opposite ends of the shell which are substantially opposite the center of the baffle plate, there being an aperture in the baffle plate in that end which is most adjacent the inlet, a screen positioned over the outlet, and a fibrous filtering material filling the space between the baffle plate and the screen.

3. A gas filter comprising a shell, an inclined baffle plate disposed within the shell, there being an outlet and an inlet formed in the opposite ends of the shell which are substantially opposite the center of the baffle plate, there being an aperture in the baffle plate in that end which is most adjacent the inlet, a screen positioned over the outlet, a fibrous filtering material filling the space between the baffle plate and the screen, there being an aperture formed in the shell communicating solely with the space occupied by the filtering material, permitting the filtering material to be replaced therethrough, and a removable closure for said aperture.

4. A gas filter comprising a shell, an inclined baffle plate disposed within the shell, there being an outlet and an inlet formed in the opposite ends of the shell which are substantially opposite the center of the baffle plate, there being an aperture in the baffle plate in that end which is most adjacent the inlet, a screen positioned over the outlet, a fibrous filtering material filling the space between the baffle plate and the screen, there being an aperture formed in the shell communicating solely with the space occupied by the filtering material, permitting the filtering material to be replaced therethrough, a removable closure for said aperture, there being another aperture formed in the shell communicating solely with the space between the baffle plate and the inlet permitting large impurities to be removed therethrough, and a removable closure for the last mentioned aperture.

In testimony whereof I have signed my name to this specification.

REGINALD M. RANYARD.